United States Patent
Fuse et al.

(10) Patent No.: US 9,500,240 B2
(45) Date of Patent: Nov. 22, 2016

(54) DISK BRAKE

(71) Applicant: HITACHI AUTOMOTIVE SYSTEMS, LTD., Ibaraki (JP)

(72) Inventors: Takaaki Fuse, Yamanashi (JP); Satoru Tsurumi, Yamanashi (JP); Jun Watanabe, Kanagawa (JP); Takayasu Sakashita, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 78 days.

(21) Appl. No.: 13/945,389

(22) Filed: Jul. 18, 2013

(65) Prior Publication Data
US 2014/0034430 A1 Feb. 6, 2014

(30) Foreign Application Priority Data

Jul. 31, 2012 (JP) ................. 2012-170458

(51) Int. Cl.
| | |
|---|---|
| *F16D 65/14* | (2006.01) |
| *F16D 55/226* | (2006.01) |
| *F16D 65/18* | (2006.01) |
| *F16D 65/56* | (2006.01) |
| *F16D 121/04* | (2012.01) |
| *F16D 121/24* | (2012.01) |
| *F16D 123/00* | (2012.01) |
| *F16D 125/36* | (2012.01) |
| *F16D 125/48* | (2012.01) |
| *F16D 125/50* | (2012.01) |

(52) U.S. Cl.
CPC ............ *F16D 55/226* (2013.01); *F16D 65/18* (2013.01); *F16D 65/567* (2013.01); *F16D 2121/04* (2013.01); *F16D 2121/24* (2013.01); *F16D 2123/00* (2013.01); *F16D 2125/36* (2013.01); *F16D 2125/48* (2013.01); *F16D 2125/50* (2013.01)

(58) Field of Classification Search
CPC ............... F16D 55/226; F16D 65/567; F16D 2121/04; F16D 2121/24; F16D 2125/48; F16D 2125/50; F16D 2125/36
See application file for complete search history.

(56) References Cited

U.S. PATENT DOCUMENTS

| | | | | |
|---|---|---|---|---|
| 6,164,732 | A * | 12/2000 | Tominaga et al. | 303/119.2 |
| 7,325,658 | B2 * | 2/2008 | Halasy-Wimmer et al. | 188/158 |
| 2003/0083797 | A1 * | 5/2003 | Yokoyama et al. | 701/70 |
| 2004/0178028 | A1 * | 9/2004 | Farmer et al. | 188/162 |
| 2008/0236963 | A1 * | 10/2008 | Yasukawa et al. | 188/156 |
| 2008/0283345 | A1 * | 11/2008 | Balz et al. | 188/72.6 |
| 2012/0325601 | A1 * | 12/2012 | Giering | 188/162 |
| 2013/0193785 | A1 * | 8/2013 | Kimmich et al. | 310/52 |
| 2015/0075923 | A1 * | 3/2015 | Jang et al. | 188/162 |

FOREIGN PATENT DOCUMENTS

WO 2011/076299 6/2011

* cited by examiner

*Primary Examiner* — Bradley King
(74) *Attorney, Agent, or Firm* — Wenderoth, Lind & Ponack, L.L.P.

(57) ABSTRACT

A disk brake (1) including a connector portion (35) provided at a housing (30). The connector portion (35) includes supply terminals (131) for supplying power to a motor (32). The supply terminals (131) of the connector portion (35) and motor terminals (32C) of the motor (32) are connected to each other via bus bars (130) made of metallic plate. Further, the bus bars (130) are held in a loosely fitted state on another-side surface (138B) of a plate-like portion (138) of a support member (135) attached to the housing (30).

14 Claims, 12 Drawing Sheets

DISK BRAKE

BACKGROUND OF THE INVENTION

The present invention relates to a disk brake for use in braking a vehicle.

For example, International Publication WO2011/076299 discloses a disk brake configured to move a piston with use of a driving three of an electric motor. This disk brake uses a flexible harness for an electric connection between the electric motor and connector connected to an ECU configured to drive and control the electric motor.

However, in the disk brake disclosed in International Publication WO2011/076299, the harness is disposed to extend to the outer circumferential side of a reduction gear, whereby the harness may be damaged due to contact with the reduction gear.

SUMMARY OF THE INVENTION

An object of the present invention is to provide a highly reliable disk brake.

To achieve the above-described an other objects, the present invention is a disk brake includes a caliper configured to press a pad against a disk by a piston slidably disposed in a cylinder, and a piston driving mechanism disposed in the caliper and configured to move the piston by a driving force of an electric motor. The piston driving mechanism includes a housing to which the electric motor is fixed, the housing containing a speed reduction mechanism configured to transmit the driving force of the electric motor. A connector portion is formed at the housing, the connector portion including a supply terminal for supplying power to the electric motor. The supply terminal of the connector portion and a motor terminal of the electric motor are connected to each other via a bus bar made of a metallic plate.

According to the disk brake of the present invention, it is possible to improve the reliability of the disk brake.

DETAILED DESCRIPTION OF THE INVENTION

Figure 1:
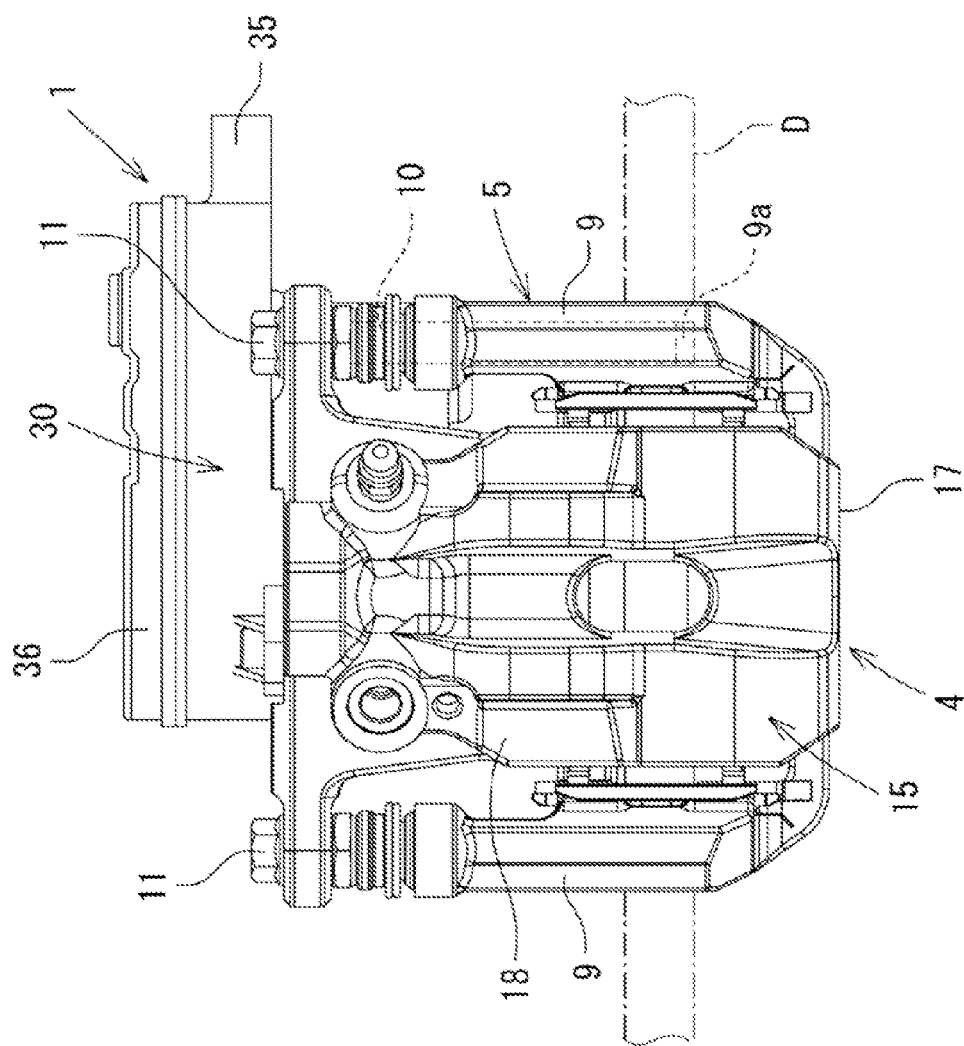
FIG. 1 is a plan view illustrating an appearance of a disk brake according to embodiments of the present invention.
Figure 2:
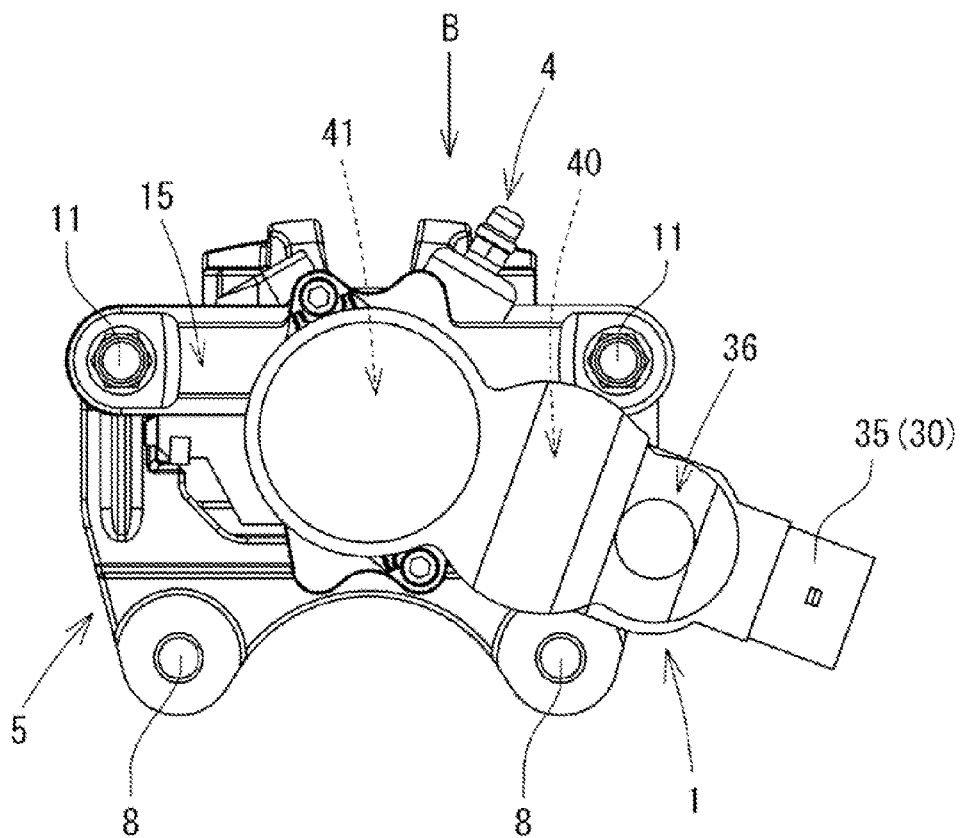
FIG. 2 is a back view illustrating the appearance of the present disk brake.
Figure 3:
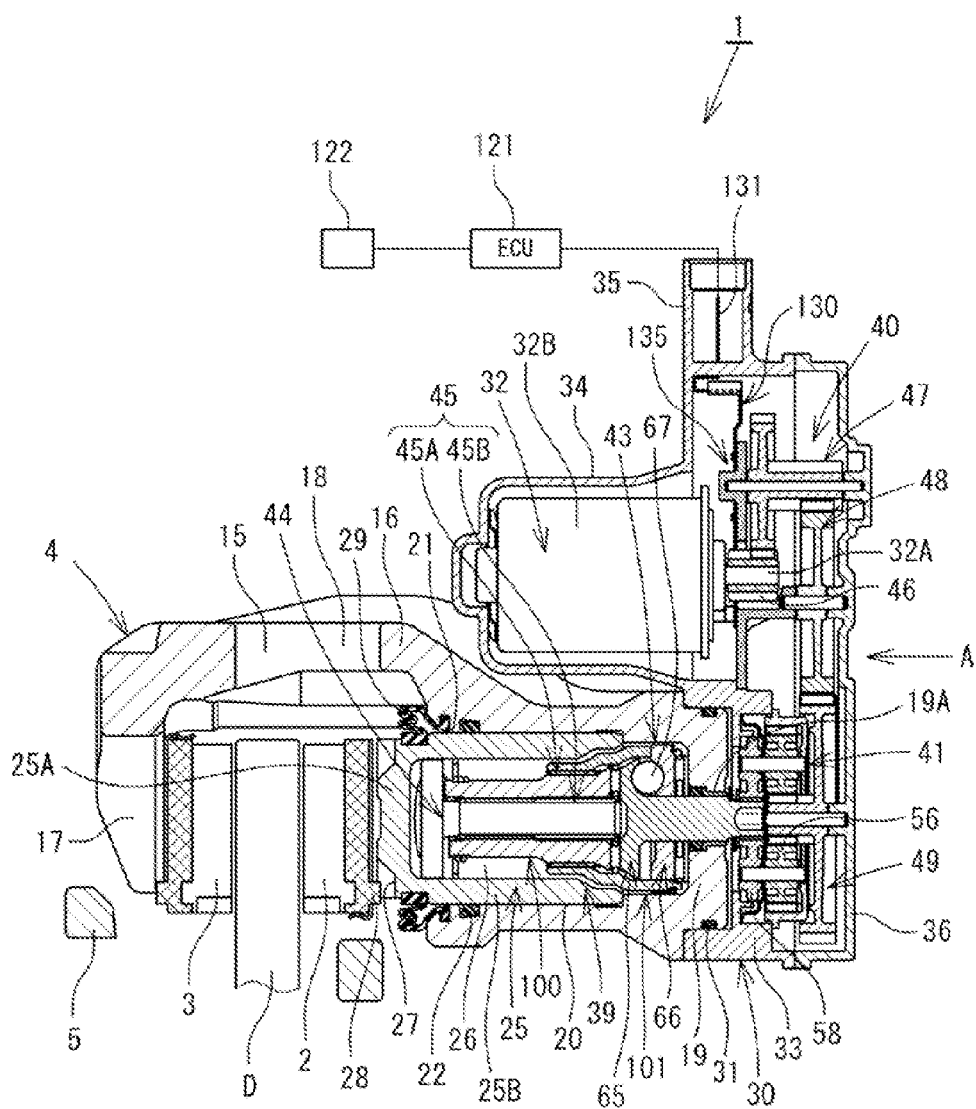
FIG. 3 is a cross-sectional view illustrating the present disk brake.

Hereinafter, embodiments of the present invention will be described in detail with reference to FIGS. 1 to 16. As illustrated in FIGS. 1 to 3, a disk brake 1 according to the embodiments of the present invention includes a pair of brake pads 2 and 3 disposed at both axial sides opposite of a disk rotor D attached to a rotational portion of a vehicle, a caliper 4, and a bracket 5 supporting them. The disk brake 1 is configured as a caliper floating type disk brake, and the above-described pair of brake pads 2 and 3 and caliper 4 are supported by the bracket 5 fixed to a non-rotatable portion (not illustrated) such as a knuckle of the vehicle so as to be movable in the axial direction of the disk rotor D. In the following description, the term "inner brake pad 2" will be used to refer to the brake pad disposed at the inner site of the vehicle relative to the disk rotor D among the pair of brake pads 2 and 3, and the term "outer brake pad 3" will be used to refer to the brake pad disposed at the outer side of the vehicle relative to the disk rotor D among the pair of brake pads 2 and 3.

The bracket 5 includes a pair of bolt holes 8 and 8 for fixing the bracket 5 to the non-rotatable portion of the vehicle. The bracket 5 is fixed to the non-rotatable portion of the vehicle by attachment bolts (not illustrated) screwed or inserted in the respective bolt holes 8. The bracket 5 includes a pair of attachment shaft portions 9 and 9 at positions spaced apart from the respective, bolt holes 8 and 8 along the circumferential direction of the disk rotor D. The respective attachment shaft portions 9 and 9 are formed so as to extend in the axial direction of the disk rotor D beyond the outer circumference of the disk rotor D. Pin holes 9a and 9a are formed within the respective attachment shafts 9 and 9. The pin holes 9a and 9a are used to allow slide pins 10 and 10 provided to the caliper 4 to be disposed slidably in the axial direction of the disk rotor D. The respective slide pins 10 and 10 are fixed to as caliper main body 15 of the caliper 4, which will be described below, by bolts 11 and 11.

As illustrated in FIGS. 1 and 3, the caliper main body 15, which is a main body of the caliper 4, includes a cylinder portion 16 disposed at the inner side of the vehicle relative to the disk rotor D, a claw portion 17 disposed at the outer side of the vehicle relative to the disk rotor D, and a bridge portion 18 disposed at a position beyond the outer circumference of the disk rotor D and connecting the cylinder portion 16 and the claw portion 17. The caliper main body 15 is constructed by integrally forming these cylinder portion 16, claw portion 17, and bridge portion 18 from as metal such as aluminum allow and a cast iron. A bottomed cylinder bore 20 is formed within the cylinder portion 16. The cylinder bore 20 is formed in such to manner that an opening 2 is located at the end of the cylinder bore 20 that faces the inner brake pad 2, and the axially opposite end therefrom is closed by a bottom wall 19 including a hole portion 19A. The cylinder bore 20 includes a circumferential groove formed on the inner circumferential surface thereof adjacent to the opening 21, and a piston seal 22 is disposed in this circumferential groove. The piston seal 22 seals a piston 25, which will be described below.

Figure 4:
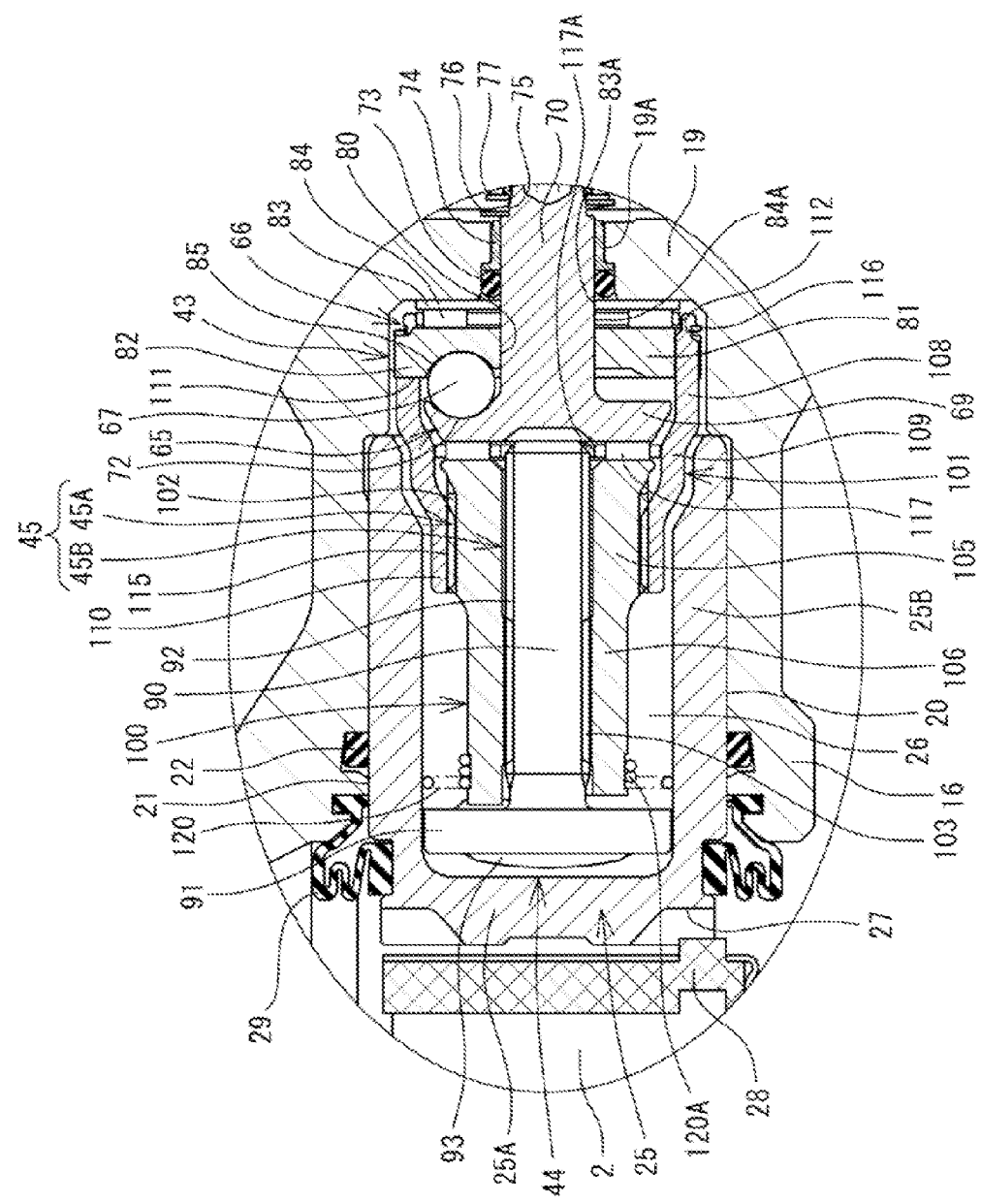
FIG. 4 is an enlarged cross-sectional view illustrating a part of the disk brake illustrated in FIG. 3.

Also referring to FIG. 4, the piston 25 is contained within the cylinder portion 16. The piston 25 is formed into a bottomed cup shape including a bottom portion 25A and a cylindrical portion 25B. The piston 25 is disposed in such a manner that the bottom portion 25A thereof faces the inner brake pad 2. The piston 25 is axially movably contained, in the cylinder bore 20 while in contact with the piston seal 22. A hydraulic chamber 26 defined by the piston seal 22 is formed in the cylinder bore 20 between the piston 25 and the bottom wall 19 of the cylinder bore 20. Brake fluid is supplied from a not-illustrated hydraulic source such as a master cylinder or a hydraulic control unit into the hydraulic chamber 26 via a not-illustrated port formed at the cylinder portion 16. A recess 27 is formed at the outer circumferential side of the bottom surface of the bottom portion of the piston 25, which faces the inner brake pad 2. This recess 27 is configured to be engaged with a protrusion 28 formed at the back surface of the inner brake pad 2. This engagement between the recess 27 and the protrusion 28 prevents the piston 25 from rotating relative to the cylinder portion 16, and therefore relative to the caliper main body 15. Further, as dust boot 29 is disposed between the bottom portion 25A of the piston 25 and the cylinder portion 16 for preventing a foreign object from entering the cylinder bore 20.

As illustrated in FIGS. 1 to 3 and 5, a housing 30 is attached to the end of the cylinder portion 16 of the caliper main body 15 where the bottom wall 19 is located. The housing 30 is integrally formed into a substantially elongated cylindrical shape from a synthetic resin material. The housing includes a first housing portion 33, a second housing portion 34, and a connector portion 35. The first housing portion 33 is configured to cover the outer circumference of the bottom wall 19 of the cylinder bore 20, and contain, for example, a planetary gear reduction mechanism 41, which will be described below. The first housing 33 and the bottom wall 19 of the cylinder portion 16 are sealed by as seal member 31 disposed along the outer circumference of the bottom wall 19, and the interior of the housing 30 is maintained airtight by this seal member 31. The second housing portion 34 is arranged adjacent to the first housing portion 33, and is configured to contain, for example, a motor 32 arranged adjacent to the cylinder portion 16, and a multi-stage spur reduction mechanism 40, which will be described below. The connector portion 35 is disposed so as to protrude from the side wall of the second housing portion 34 outwardly in the radial direction of the motor 32, and is firmed into a cylindrical shape. Two supply terminals 131 and 131 are disposed within the connector portion 35 for supplying power to the motor 32. Further, a cover 36 made from a synthetic resin is attached to an opening of the housing 30 at an opposite side from the end of the housing 30 attached to the cylinder portion 16. The cover 36 is formed into a shape capable of covering the whole opening. The housing 30 and the cover 36 are joined by welding together the ends of the openings thereof, and the interior of the housing 30 is maintained airtight. The housing 30 and the cover 36 are welded by a known welding method such as laser welding or ultrasonic welding. Alternatively, the housing 30 and the cover 36 may be joined by not only the above-described welding but also, for example, bonding or screw fixing. If the housing 30 and cover 36 are joined by screw fixing, it is desirable to use a seal member to maintain the air-tightness inside the housing 30.

As illustrated in FIG. 3, the caliper main body 15 includes a piston driving mechanism 39 configured to move the piston 25 by driving the motor 32, and the multi-stage spur reduction mechanism 40 and the planetary gear reduction mechanism 41 as speed reduction mechanisms for powering, up a rotation of the motor 32. The piston driving mechanism 39 also has a function of maintaining a thrust force for holding the piston 25 at a brake applying position. Further, the embodiments of the present invention include the multi-stage spur reduction mechanism 40 and the planetary gear reduction mechanism 41 as the speed reduction mechanisms for powering up a rotation of the motor 32 to acquire a rotational force for thrusting the piston 25, but the embodiments of the present invention do not necessarily have to include both of them, and any one of the speed reduction mechanisms may be omitted.

The piston driving mechanism 39 includes a ball-and-ramp ramp mechanism 43, a push rod 44, and a screw mechanism 45. The ball-and-ramp mechanism 43 converts a rotational motion from the multi-stage spur reduction mechanism 40 and the planetary gear reduction mechanism 41 into a motion in a linear direction (hereinafter referred to as to linear motion for convenience of description), thereby applying as thrust force to the piston 25. The push rod 44 is configured to press the piston 25 according to an operation of the ball-and-ramp mechanism 43. The screw mechanism 45 is disposed between the push rod 44 and the bottom wall 19 of the cylinder portion 16, more specifically, the ball-and-ramp mechanism 43, and is configured to function as a thrust force maintenance mechanism for holding the piston 25 at the brake applying position. These ball-and-ramp mechanism 43, push rod 44, and screw mechanism 45 are contained in the cylinder bore 20 of the caliper main body 15.

As illustrated in FIGS. 3 and 4, the ball-and-ramp mechanism 43 includes a rotation/linear motion ramp 65, a rotational ramp 66, and as plurality of balls 67 disposed between the rotation/linear motion ramp 65 and the rotational ramp 66.

The rotation/linear motion ramp 65 includes a disk-like rotation/linear motion plate 69, and a cylindrical portion 70 integrally extending from a substantially radially central position of the rotation/linear motion plate 69, thereby being formed into a T shape in cross-section in the axial direction. The cylindrical portion 70 is disposed so as to be inserted through an insertion hole 80 formed at a substantially radially central position of a rotational plate 81 of the rotational ramp 66, a through-hole 84A of a thrust bearing 84, a through-hole 83A of a thrust washer 83, and a hole 19A formed at the bottom wall 19 of the cylinder bore 20. A spline shall portion 71 (refer to FIG. 5) is integrally formed at the tip of the cylindrical portion 70. The spline shaft portion 71 is fitted in a spline hole 58A formed at a carrier 58 of the planetary gear reduction mechanism 41, which will be described below. Further, as plurality of ball grooves 72, in particular, three ball grooves 72 in the embodiments of the present invention are formed at the wake of the rotation/linear motion plate 69 that faces the rotational plate 81 of the rotational ramp 66. Each of the ball grooves 72 has a predetermined inclination angle along the circumferential direction while extending in an arcuate manner, and has an arcuate shape in cross-section in the radial direction thereof. Further, an O-ring 73 and a sleeve 74 are disposed between the hole portion 9A of the bottom wall 19 of the cylinder bore 20, and the outer circumferential surface of the cylindrical portion 70 of the rotation/linear motion ramp 65, thereby maintaining the air-tightness of the hydraulic chamber 26. An annular groove portion 75 is formed on the outer circumferential surface at the tip of the cylindrical portion 70 of the rotation/linear motion ramp 65. A wave washer 76 and a retaining; ring 77 are disposed in the annular groove portion 75. The wave washer 76 and the retaining ring 77 allow an axial movement of the rotation/linear motion ramp 65 toward the inner and outer brake pads 2 and 3 by application of a parking brake, within as predetermined range.

The rotational ramp 66 is configured as the rotational plate 81 including the insertion hole 80 formed at the substantially radially central position thereof. A plurality of fitting protrusions 82 is formed at the outer circumferential portion of the rotational plate 81 in a spaced-apart relationship in the circumferential direction. A wave clip 116, which will be described below, is placed on as fitting stepped surface, which is one step below the to surface of each of the fitting protrusions 82. The rotational plate 81 is formed in such as manner that the outer diameter including the respective fitting protrusions 82 is larger than the outer diameter of the rotation/linear motion plate 69 of the rotation/linear motion ramp 65. The rotational plate 81 is supported rotatably relative to the bottom wall 19 of the cylinder bore 20 via the thrust washer 83 and the thrust bearing 84. A plurality of ball grooves 85, in particular, three ball grooves 85 in the embodiments of the present invention are formed at the surface of the rotational plate 81 that faces the rotation/linear motion plate 69 of the rotational linear motion ramp 65. Each of the ball grooves 85 has a predetermined inclination angle along the circumferential direction while extending in an arcuate manner, and has an arcuate shape in cross-section in the radial direction thereof.

A single ball 67 is disposed between each of the ball grooves 72 of the rotation/linear motion plate 69 of the rotation/linear motion ramp 65, and each of the ball grooves 85 of the rotational plate 81 of the rotational ramp 66. The ball-and-ramp mechanism 43 is configured in such a manner that application of a rotational torque on the rotation/linear motion ramp 65 causes rolling motions of the balls 67 between the respective ball grooves 72 of the rotation/linear motion plate 69 and the respective ball grooves 85 of the rotational plate 81, which generates a rotational difference between the rotation/linear motion plate 69 and the rotational plate 81, i.e., the rotation/linear motion ramp 65 and the rotational ramp 66, thereby changing an axial relative distance between the rotation/linear motion plate 69 and the rotational plate 81.

The push rod 44 is formed into a T shape in cross-section, and includes a shaft portion 90 and a disk-like flange portion 91 integrally connected to the end of the shaft portion 90 closer to the inner and outer brake pads 2 and 3. A male screw portion 92 is formed at the shaft portion 90 from the substantially axially central position to the tip of the shaft portion 90. The male screw portion 92 is configured to be screwed with a female screw portion 103 formed on the inner circumferential surface of an adjuster nut 100, which will be described below. The tip of the shaft portion 90 is disposed so as to face the substantially radially central position of the rotation/linear motion ramp 65 (the rotation/linear motion plate 69) of the ball-and-ramp mechanism 43 via the interior of a through-hole 117A of a thrust bearing 117. The flange portion 91 is formed in such a manner that the outer diameter thereof is substantially equal to the inner diameter of the piston 25, and is disposed so as to face the bottom portion 25A of the piston 25. The push rod 44 is allowed to axially move but is prevented from rotationally moving relative to the piston 25 due to the engagement relationship between the outer circumferential surface of the flange portion 91 and the inner circumferential surface of the cylindrical portion 25B of the piston 25. A spherical protrusion 93 is formed in a protruding manner at the substantially radially central position of the flange portion 91. The spherical protrusion 93 protrudes toward the bottom portion 25A of the piston 25. This spherical protrusion 93 is configured to abut against the bottom portion 25A of the piston 25 when the push rod 44 moves forward according to operations of the motor 32 and the ball-and-ramp mechanism 43.

The screw mechanism 45 is configured as the thrust force maintenance mechanism for holding the piston 25 at the brake applying position. The screw mechanism 45 includes a screwed portion 45A between a male screw portion 102 of the adjuster nut 100 and a female screw portion 115 of a base nut 101, and a screwed portion 45B between the female screw portion 103 of the adjuster nut 100 and the male screw portion 92 of the push rod 44.

The adjuster nut 100 is formed into a cylindrical shape having a length substantially equal to the length of the shaft portion 90 of the push rod 44. The adjuster nut 100 includes a large-diameter cylindrical portion 105 with the male screw portion 102 formed on the outer circumferential surface, and a small-diameter cylindrical portion 106 extending from the large-diameter cylindrical portion 105 toward the inner and outer brake pads 2 and 3. The female screw portion 103, which is configured to be screwed with the male screw portion 92 of the push rod 44, is formed at the adjuster nut 100 over the whole axial range of the inner circumferential surface thereof. The male screw portion 102 is formed on the outer circumferential surface of the large-diameter cylindrical portion 105 of the adjuster nut 100. The male screw portion 102 is configured to be screwed with the female screw portion 115 formed on the inner circumferential surface of a small-diameter cylindrical portion 110 of the base nut 101, which will be described below. The adjuster nut 100 is disposed in such a manner that the end of the large-diameter cylindrical portion 105 thereof closer to the hall-and-ramp mechanism 43 axially faces the rotation/linear motion ramp 65 via the thrust bearing 117. The screwed portion 45B between the male screw portion 92 of the push rod 44 and the female screw portion 103 of the adjuster nut 100 is set in such a manner that the adjuster nut 100 does not rotate in the rearward direction by application of an axial load from the piston 25 to the rotation/linear motion ramp 65, i.e., the screwed portion 45B is set as a screw having large irreversibility.

The base nut 101 is formed into a cylindrical shape as a whole. The base nut 101 includes a large-diameter cylindrical portion 108, a multi-stepped cylindrical portion 109 extending from the large-diameter cylindrical portion 108 toward the inner and outer brake pads 2 and 3 while reducing its diameter in a continuous stepwise manner, and a small-diameter cylindrical portion 110 continuously extending from the multi-stepped cylindrical portion 109 toward the inner and outer brake pads 2 and 3. The large-diameter cylindrical portion 108 has an outer diameter substantially equal to the outer diameter of the rotational plate 81 (the outer diameter including the respective fitting protrusions 82) of the rotational ramp 66. A plurality of fitting recesses 111 is formed at the upper end of the circumferential wall of the large-diameter cylindrical portion 108 in a spaced-apart relationship in the circumferential direction. The respective fitting recesses 111 open at the axial one sides thereof, and the respective fitting protrusions 82 formed at the rotational plate 81 of the rotational ramp 66 are configured to be fitted in the respective fitting recesses 111. A loosely fitting groove portion 112 is formed on the outer circumferential surface of the large-diameter cylindrical portion 108 except for the respective fitting recesses 111. The wave clip 116, which will be described below, is loosely fitted in the loosely fitting groove portion 112 along the circumferential direction. The female screw portion 115 is formed on the inner circumferential surface of the small-diameter cylindrical portion 110. The female screw portion 115 is configured to be screwed with the male screw portion 102 formed on the outer circumferential surface of the adjuster nut 100. The screwed portion 45A between the male screw portion 102 of the adjuster nut 100 and the female screw portion 115 of the base nut 101 is set in such a manner that the adjuster nut 101 does not rotate in the rearward direction by application of an axial load from the piston 25 to the rotation/linear motion ramp 65, i.e., the screwed portion 45A is set as a screw having large irreversibility.

The wave clip 116 loosely fitted in the loosely fitting groove portion 112 formed at the base nut 101 is made of a thin plate annular material waved in the thickness direction along the circumferential direction. The wave clip 116 connects the base nut 101 and the rotational plate 81 of the rotational ramp 66, and biases the base nut 101 toward the bottom wall 19 of the cylinder portion 16 relative to the rotational plate 81. By this wave clip 116, the balls 67 of the hall-and-ramp mechanism 43 are maintained between the rotation/linear motion ramp 65 and the rotational ramp 66.

Further, as illustrated in FIGS. 3 and 4, a coil portion 120A of a spring clutch 120 as a one direction clutch member is wound around the outer circumference of the small-diameter cylindrical portion 106 of the adjuster nut 100. The spring clutch 120 abuts against the piston 25 in such a manner that the outer circumferential side thereof is allowed to axially move but is prevented from rotationally moving relative to the piston 25. This spring clutch 120 is configured to apply a rotational torque when the adjuster nut 100 is supposed to rotate in one direction but to apply almost no rotational torque when the adjuster nut 100 is supposed to rotate in the other direction. In the embodiments of the present invention, the spring clutch 120 is configured so as to apply a rotational resistance torque for the rotational direction when the adjuster nut 100 moves toward the ball-and-ramp mechanism 43. The rotational resistance torque of the spring clutch 120 is stronger than the rotational resistance torque of the screwed portion 45A between the male screw portion 102 of the adjuster nut 100 and the female screw portion 115 of the base nut 101, which is generated by the biasing force of the wave clip 116 when the adjuster nut 100 moves backward relative to the base nut 101.

Figure 5:
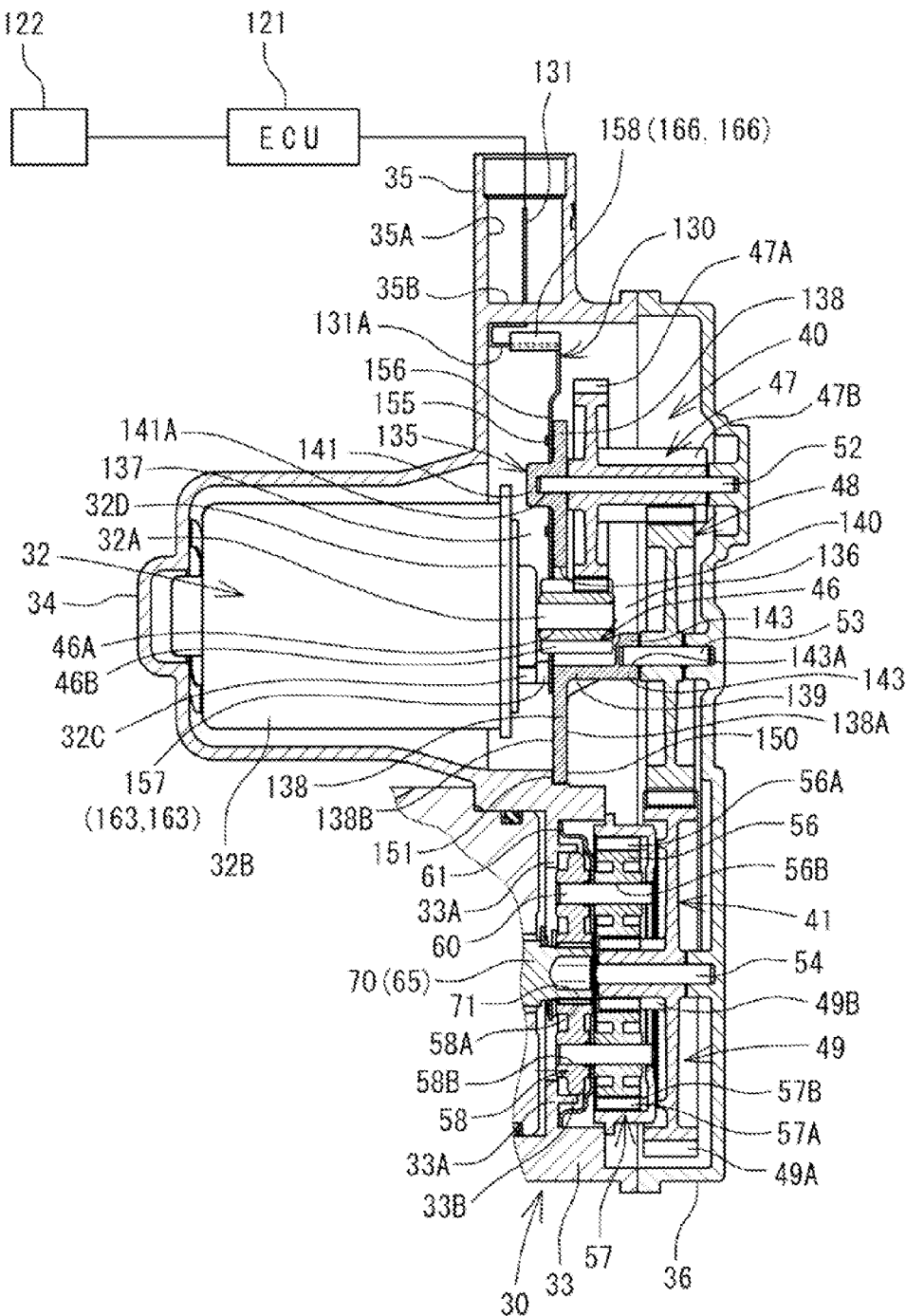
FIG. 5 is an enlarged cross-sectional view illustrating a part of the disk brake illustrated in FIG. 3.

As illustrated in FIGS. 3 and 5, the multi-stage spur reduction mechanism 40 includes a pinion gear 46, a first reduction gear 47, as non-reduction spur gear 48, and a second reduction gear 49. The pinion gear 46 is formed into a cylindrical shape, and includes a hole portion 46A in which the rotational shaft 32A of the motor 32 is fixedly press-fitted, and as gear 46B formed along the outer circumference. The first reduction gear 47 is configured as a stepped gear integrally including a large-diameter large gear 47A meshed with the gear 46B of the pinion year 46, and a small-diameter small gear 47B formed so as to axially extend from the large year 47A. The first reduction year 47 is held at one end thereof by a support member 135, and is rotatably supported at the other end by a shall 52 held by the cover 36. The small gear 47B of the first speed reduction gear 47 is meshed with the non-reduction spur gear 48. The non-reduction spur gear 48 is held at one end by the support member 135, and is rotatably supported at the other end by a shaft 53 held by the cover 36. The second reduction gear 49 is configured as a stepped gear integrally including a large-diameter large gear 49A meshed with the non-reduction spur gear 48, and a small-diameter sun gear 49 formed so as to axially extend from the large gear 49A. The second reduction gear 49 is rotatably supported by as shaft 54 held by the cover 36. The sun gear 49B constitutes a part of the planetary gear reduction mechanism 41, which will be described below.

The planetary gear reduction mechanism 41 includes the sun gear 49B of the second reduction gear 49, a plurality of planetary gear 56 (four planetary gears 56 in the embodiments of the present invention), an internal gear 57, and the carrier 58. The planetary gear 56 includes a gear 56A meshed with the sun gear 49B of the second reduction gear 49, and a hole portion 56B for insertion of a pin 60 erected from the carrier 58. The tour planetary gears 56 are equiangularly disposed along the circumference of the carrier 58.

The carrier 58 is formed into a disk shape, and includes a spline hole 58A formed at a substantially radially central position thereof. The spline hole 58A of the carrier 58 is fitted to the above-described spline shaft portion 71 formed at the tip of the cylindrical portion 70 of the rotation/linear motion ramp 65 of the ball-and-ramp mechanism 43, thereby allowing a rotational torque to be transmitted between the carrier 58 and the rotation/linear motion ramp 65. A plurality of pin holes 58B is formed along the outer circumference of the carrier 58 in a spaced-apart relationship along the circumferential direction. Pins 60 are respectively held in the respective pin hole portions 58B. The pins 60 rotatably support the respective planetary gears 56. The carrier 58 and the respective planetary gears 56 are prevented from axially moving by a wall surface 33A of the first housing portion 33 and an annular wall portion 57B integrally formed at the end of the internal gear 57 closer to the second reduction gear 49. Further, the carrier 58 is prevented from radially moving by as cylindrical wall portion 33B formed in as protruding manner from the wall surface 33A. A cover 61 covering the outer circumference of the carrier 58 is disposed between the carrier 58 and the respective planetary gears 56.

The internal gear 57 includes internal teeth 57A meshed with the respective gears 56A of the planetary gears 56, and the annular wall portion 57B integrally formed at the end of the internal gear 57 closer to the second reduction gear 49 continuously from the internal teeth 57A for preventing the respective planetary gears 56 from axially moving. The internal gear 57 is fixed in the housing portion 33 so as to be prevented from moving axially and rotationally.

As illustrated in FIGS. 3 and 5, the motor 32 is disposed adjacent to the caliper main body 15, and is contained in the second housing portion 34. A rotational shall 32A of the motor 32 extends toward the cover 36, and is configured in such a manner that the pinion gear 46, which will be described below, is fixedly press-fitted at the tip side thereof. The motor 32 is connected to an ECU 121 constituted by an electric control apparatus which is as controller for driving and controlling the motor 32, via bus bars 130. A parking switch 122, which is operated to instruct application and release of the parking brake, is connected to the ECU 121. Also referring to FIG. 6, two motor terminals 32C are provided at a main body portion 32B of the motor 32. The motor terminals 32C extend in the same direction as the direction in which the rotational shaft 32A extends. These motor terminals 32C are constituted by elongated plate-like bodies, and are disposed at the radial opposite sides of the rotational shaft 32A. As will be described below, these motor terminals 32C are connected to motor-side socket portions 157 of the respective bus bars 130.

Further, the cylindrical connector portion 35 is formed at the end of the housing 30. The connector portion 35 has a bottomed inner hole 35A. A connector plug (not illustrated) provided at the tip of a cable extending from the ECU 121 is connected to the connector portion 35 by being fitted in the inner hole 35A. Two supply terminals 131 are provided in the connector portion 35. Connection terminals (not illustrated) in the connector plug from the ECU 121 are electrically connected to the supply terminals 131. Each of the supply terminals 131 is formed into a metallic elongated plate-like body. Further, each of the supply terminals 131 is formed so as to have one end side axially extending throw the radial center of the inner hole 35A of the connector portion 35 and penetrating through a wall portion 35B between the connector portion 35 and the second housing portion 34, and the other end extending along the inner wall surface of the second housing portion 34. Bus bar-side ends 131A of the respective supply terminals 131 extend from the inner wall surface of the second housing portion 34 toward the first reduction mechanism 47 (toward the cover 36), respectively. As will be described below, the respective supply terminals 131 are connected to ECU-side socket portions 158 of the respective bus bars 130.

A support member 135 made of a resin is disposed between the first reduction gear 47 and the non-reduction spur gear 48 of the multi-stage spur reduction mechanism 40, and the main body portion 32B of the motor 32 within the second housing portion 34. The support member 135 is constituted by a plate-like member. The support member 135 divides the interior of the second housing portion 34 into an area 136 where the first reduction gear 47 and the non-reduction spur gear 48 of the multi-stage spur reduction mechanism 40 as the speed reduction mechanism are disposed, and an area 137 where the first reduction gear 47 and the non-reduction spur gear 48 of the multi-stage spur reduction mechanism 40 are not disposed.

Figure 6:
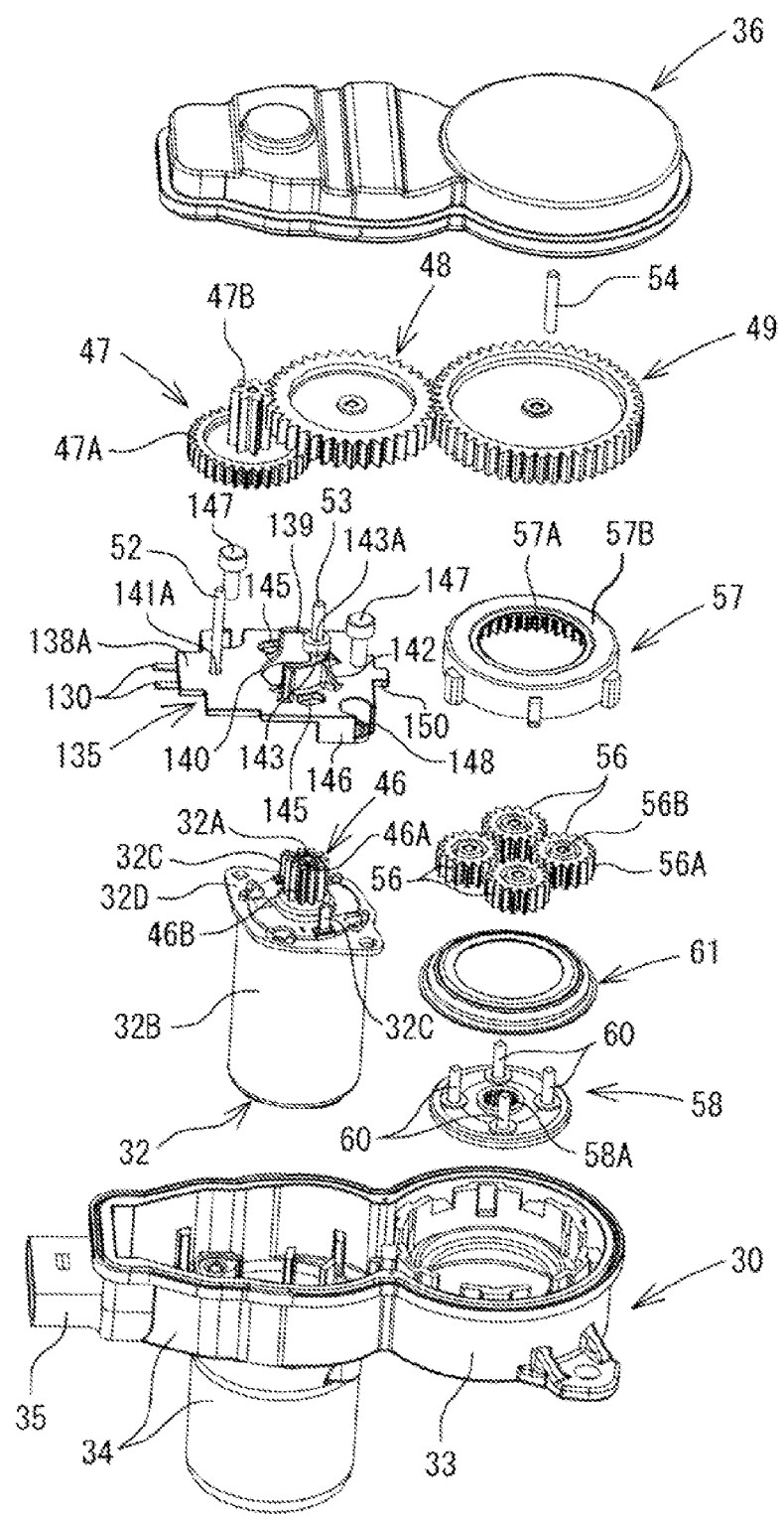
FIG. 6 is an exploded perspective view illustrating components in a housing illustrated in FIG. 3.
Figure 7:
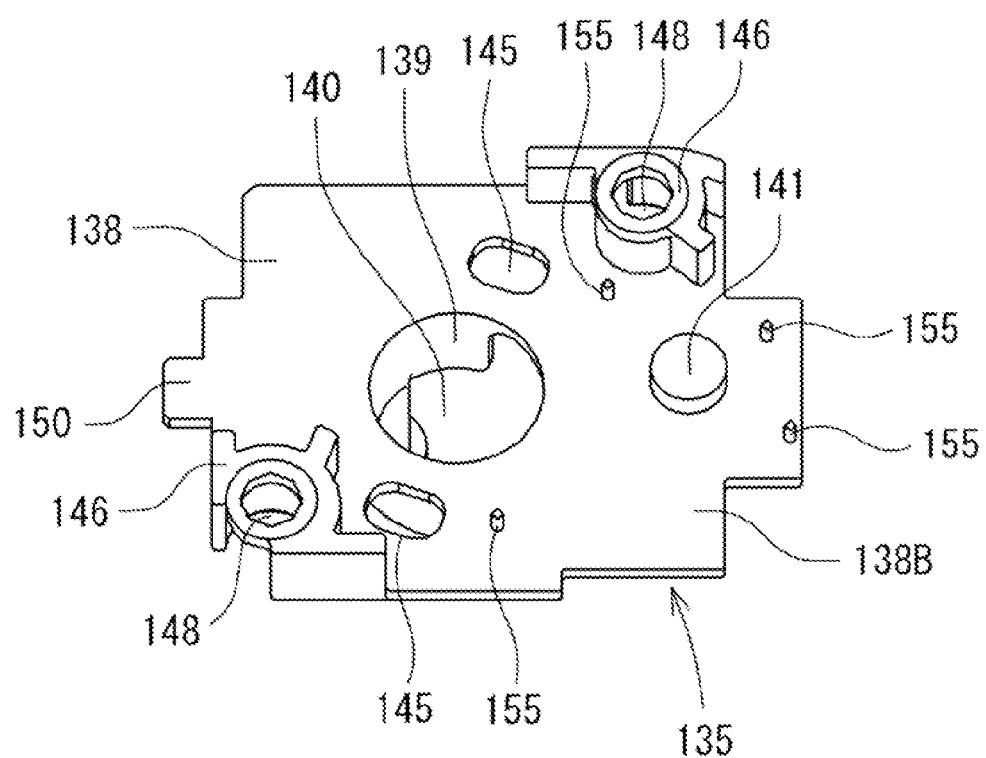
FIG. 7 is a perspective view illustrating a support member as viewed from a motor side.
Figure 8:
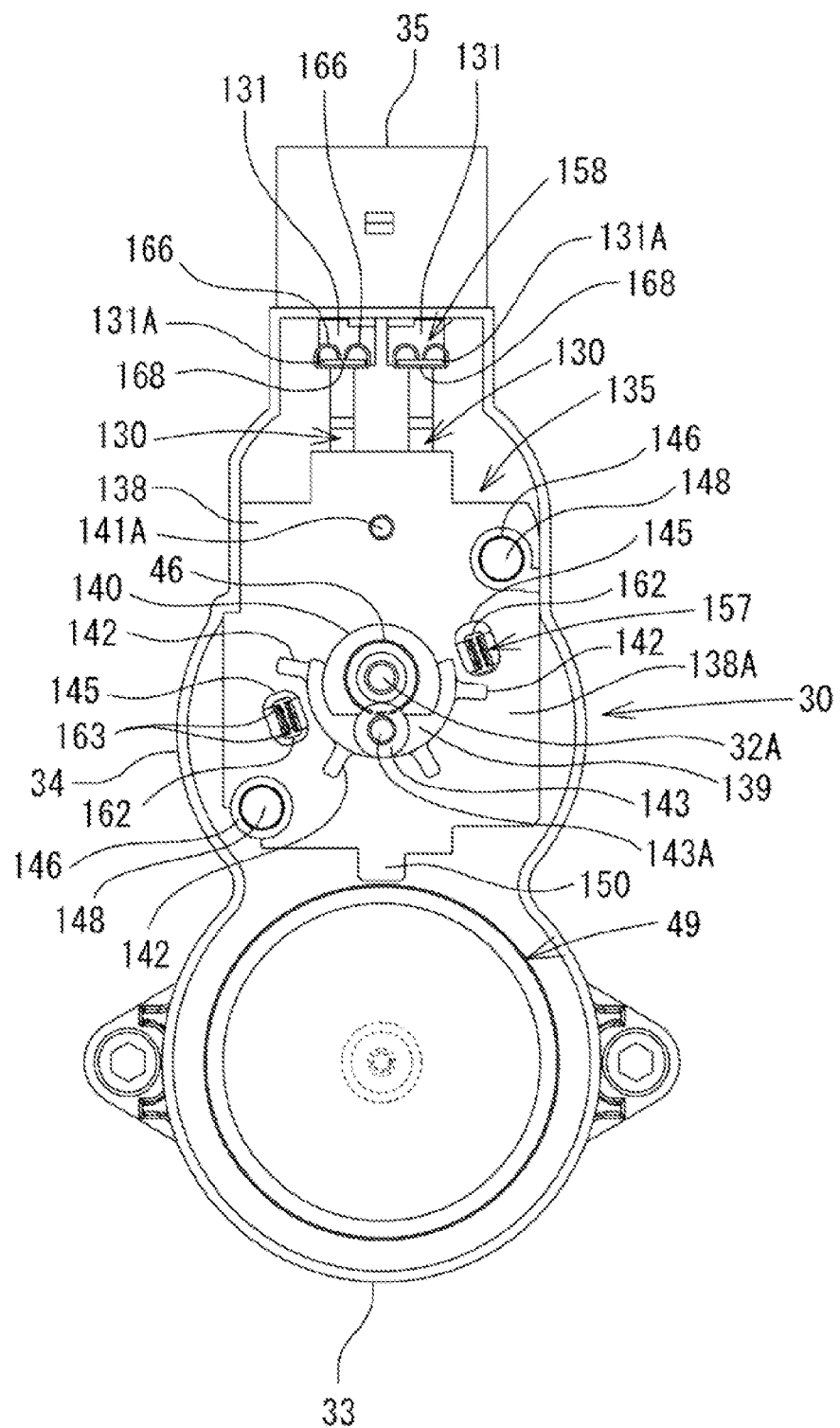
FIG. 8 illustrates the interior of the housing as viewed from a cover side.
Figure 9:
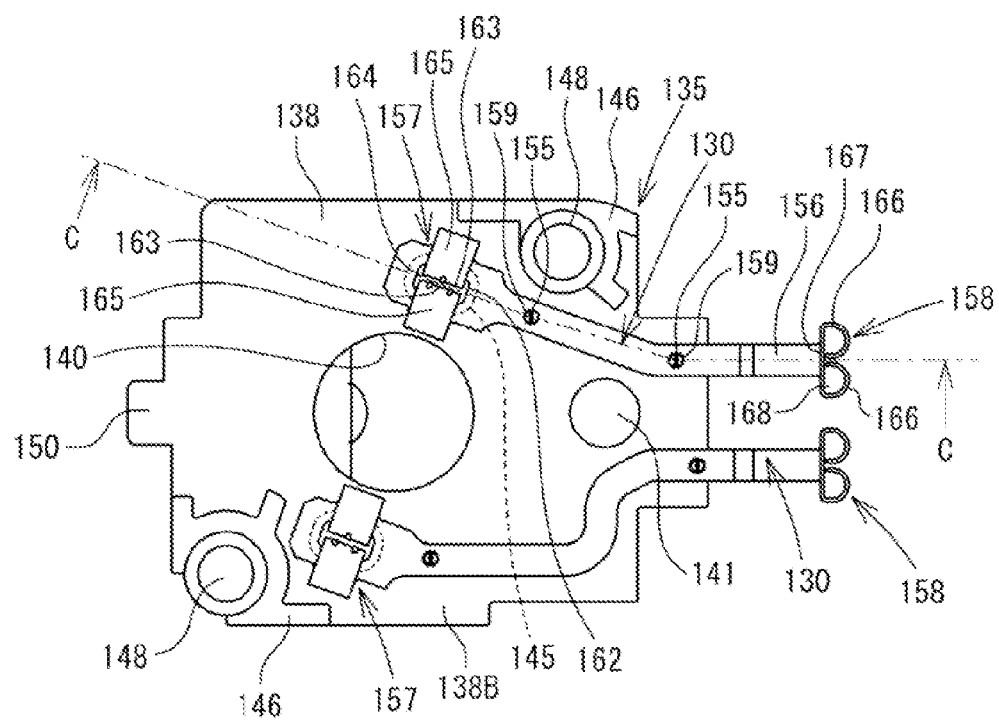
FIG. 9 illustrates the support member with each bus bar supported thereon according to a first embodiment, as viewed from the motor side.
Figure 10:
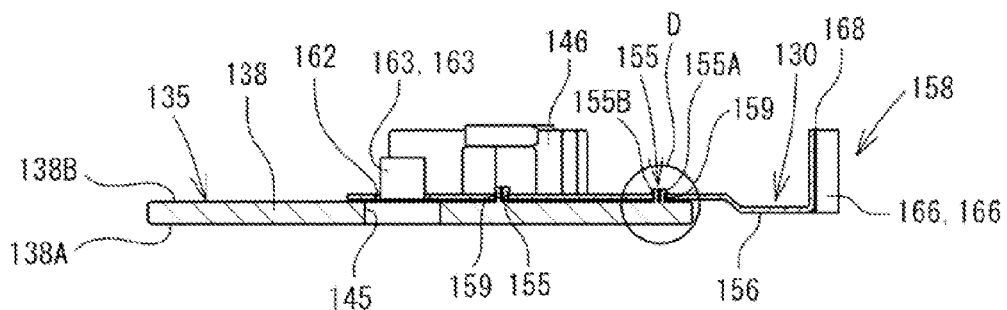
FIG. 10 is a cross-sectional view taken along a line C-C in FIG. 9.

As illustrated in FIGS. 5 to 7, the support member 135 includes a plate-like portion 138 constituting a main body of the support member 135. The plate-like portion 138 includes an insertion hole 140 for insertion of the pinion gear 46 fixed to the rotational shaft 32A of the motor 32. A cutout cylindrical portion 139 is formed in a protruding manner from around the insertion hole 140 on one-side surface 138A of the plate-like portion 138 at the speed reduction mechanism side, i.e., the surface 138A that faces the area 136 where the first reduction mechanism 47 and the non-reduction spur gear 48 are disposed. The cutout cylindrical portion 139 has a partially cutout circumferential wall. This cutout cylindrical portion 139 is disposed so as to cover the outer circumference of the pinion gear 46 with a part thereof exposed. The large gear 47A of the first reduction mechanism 47 and the pinion gear 46 are meshed with each other at the cutout portion of the circumferential wall of the cutout cylindrical portion 139.

As illustrated in FIGS. 5 and 7, a circular protruding portion 141 is firmed in a protruding manner at a predetermined position from the cutout portion of the circumferential wall of the cutout cylindrical portion 139 toward the connector portion 35 of the housing 30, on another-side surface 138B of the plate-like portion 138 of the support member 135, the surface 138B at the motor side, which faces the area 137 where the first reduction mechanism 47 and the non-reduction spur gear 48 are not disposed. A hole portion 141A is formed at the position corresponding to the protruding portion 141 on the one-side surface 138A of the plate-like portion 138. The hole portion 141A supports the shaft 52, which in turn rotatably supports the first reduction gear 47. Further, a plurality of ribs 142 are formed between the outer circumferential surface out cylindrical portion 139 and the one-side surface 138A of the plate-like portion 138 so as to connect them. The respective ribs 142 are formed in a spaced-apart relationship in the circumferential direction of the cutout cylindrical portion 139. A cylindrical bearing portion 143 is integrally formed at a predetermined position on the tip surface the cutout cylindrical portion 139. A hole portion 143A is formed at the substantially radially central position of the bearing portion 143, and the hole portion 143A supports the shaft 53, which in turns rotatably supports the non-reduction spur gear 48. Two through-holes 145 and 145 are formed at positions radially outer side of the through-hole 140 of the plate-like portion 138. The respective motor terminals 32C extending from the main body portion 32B of the motor 32 are inserted through the through holes 145, respectively. A plurality of fixation portions 146 for fixation to the motor 32, in particular, two fixation portions 146 in the embodiments of the present invention are formed at the outer edge of the plate-like portion 138. These fixation portions 146 are provided in a protruding manner from the other-side surface 138B of the plate-like portion 138 toward the motor 32. Then, the positions corresponding to the respective fixation portions 146 are recessed on the one-side surface 138A the plate-portion 138, and the through-holes 148 are formed at the bottoms thereof. Attachment bolts 147 are inserted through the respective through-holes 148. The attachment bolts 147 are used to fix the support member 135 to the housing 30 together with a flange portion 32D of the motor 32. These insertion holes 148 are disposed in such a manner that the insertion hole 140 through which the pinion gear 46 is inserted, and the respective through-holes 145 and 145 through which the respective motor terminals 32C are inserted are positioned on a line connecting the insertion holes 148. A support portion 150 is formed in a protruding manner at the outer edge of the plate-like portion 138, at the outer side of the wall surface at the opposite side from the connector portion side. This support portion 150 is supported by a wall surface 151 formed between the first housing portion 33 and the second housing portion 34 when the support member 135 is disposed in the second housing portion 34. As will be described below, the plurality of bus bars 130 (the two bus bars 130 in the embodiments of the present invention) are held on the other-side surface 138 of the plate-like portion 138 of the support member 135 by engagement portions in a loosely fitted state.

The disk brake 1 common among the embodiments of the present invention is configured in the above-described manner. Next, an operation of the disk brake 1 according to the embodiments of the present invention will be described. First, an operation of the disk brake 1 as a normal hydraulic brake, which is triggered by an operation of the brake pedal will be described. In the following description, the term "move forward" will be used to refer to a movement of the piston 25 or the push rod 44 toward the inner brake pad 2, and the term "move backward" will, be used to refer to a movement of the piston 25 or the push rod 44 toward the bottom wall 19 of the caliper 4 (the cylinder bore 20).

When a driver presses the brake pedal, a hydraulic pressure according to the pressing force applied on the brake pedal is generated in the master cylinder (not illustrated), and is supplied into the hydraulic chamber 26 in the caliper 4 via a hydraulic circuit (also not illustrated). As a result, the piston 25 moves forward (moves to the left as viewed in FIG. 3) from an original position when no brake is applied while elastically deforming the piston seal 22, and presses the inner brake pad 2 against the disk rotor D. Then, the caliper main body 15 moves to the right as viewed in FIG. 3 relative to the bracket 5 due to a reaction force of the pressing force by the piston 25, and presses the outer brake pad 3 attached to the claw portion 17 against the disk rotor D. As a result, the disk rotor D is sandwiched between the pair of inner and outer brake pads 2 and 3 to generate a frictional force, thereby eventually generating a braking three on the vehicle.

On the other hand, the driver's releasing the brake pedal causes a stop of the supply of the hydraulic pressure from the master cylinder to reduce the hydraulic pressure in the hydraulic chamber 26. As result, the piston 25 moves backward to the original position due to a recovery force the piston seal 22 from the elastic deformation to separate the disk rotor D from the pair of inner and outer brake pads 2 and 3, thereby releasing the braking force.

The disk brake 1 according to the embodiments of the present invention operates as, for example, the parking brake, and this operation will be described next. First, when the parking switch 122 is operated from a parking brake release state, the ECU 121 outputs an electric signal thereof to the motor 32 via the bus bar 130, and drives the motor 32 in the rotational direction for moving the piston 25 toward the disk rotor D. This driving of the motor 32 causes a rotation of the sun gear 49B of the planetary gear reduction mechanism 41 via the multi-stage spur reduction mechanism 40. This rotation of the sun gear 49B in turns causes a rotation of the carrier 58 via the respective planetary gears 56. Then, the rotational force of the carrier 58 is transmitted to the rotation/linear motion ramp 65. During an initial stage of transmission of the rotational three from the carrier 58 to the rotation/linear motion ramp 65, the rotation/linear motion ramp 65, the rotational ramp 66, the base nut 101, and the adjuster nut 100 rotates integrally with one another by the rotational force from the carrier 58. Then, the rotation of the adjuster nut 100 causes a relative rotation at the screwed portion 45B between the female screw portion 103 of the adjuster nut 100 and the male screw portion 92 of the push rod 44, which is the screw mechanism 45, thereby moving forward the push rod 44 (moving the push rod 44 to the left as viewed in FIG. 3). As a result, the spherical protrusion 93 of the flange portion 91 of the push rod 44 abuts against the bottom portion 25A of the piston 25, by which the piston 25 moves forward (moves to the left as viewed in FIG. 3).

After that, the motor 32 continues being driven, whereby the piston 25 starts to press the disk rotor D via the brake pads 2 and 3 according to the movement of the push rod 44. The start of generation of this pressing force stops the rotation of the adjuster nut 100. Then, the rotation/linear motion ramp 65 moves forward while rotating, and the rotational ramp 66 rotates with a rotational difference generated from the rotation/linear motion ramp 65, which causes a relative movement of the screwed portion 45A between the female screw portion 115 of the base nut 101 and the male screw portion 102 of the adjuster nut 100 to move forward the adjuster nut 100 in the axial direction (move the adjuster nut 100 to the left as viewed in FIG. 3). Then, the axial forward movement of the adjuster nut 100 causes a pressing force to be applied on the piston 25 via the push rod 44, increasing the pressing force of the piston 25 to the disk rotor D.

Then, the ECU 121 continues driving the motor 32 until the pressing force from the pair of inner and outer brake pads 2 and 3 to the disk rotor D reaches a predetermined value, i.e., a current value supplied to the motor 32 reaches a predetermined value. The ECU 121 stops the power supply to the motor 32 upon detection that the pressing three to the disk rotor D reaches the predetermined value by detecting that the current value to the motor 32 reaches the predetermined value. At this time, the reaction force of the pressing force onto the disk rotor D is applied onto the rotational ramp 66 via the piston 25 and the rotation/linear motion ramp 65. However, the adjuster nut 100 is screwed by the female screw portion 103 and the male screw portion 92 irreversible between the screw portions 103 and 92 and the push rod 44, and the base nut 101 is also screwed by the female screw portion 115 and the male screw portion 102 irreversible between the screw portions 115 and 102 and the adjuster nut 100, whereby the rotational ramp 66 is maintained in a stop state without rotating, thereby holding the piston 25 at the brake applying position. In this way, the braking force is mechanically maintained to complete the operation of the parking brake.

On the other hand, when the parking brake is released, the ECU 121 returns the piston 25 based on a parking brake release operation of the parking switch 122, i.e., drives the motor 32 in the rotational direction for separating the piston 25 from the disk rotor D. As a result, the multi-stage spur reduction mechanism 40 and the planetary gear reduction mechanism 41 rotates in the direction for returning the piston 25, whereby the push rod 44 eventually moves backward (moves to the right as viewed in FIG. 3) away from the piston 25, thereby releasing the parking brake.

Next, a first embodiment will be described with reference to FIGS. 5 and 7 to 12. In the first embodiment, the bus bars 130 are held on the support member 135 by the engagement portions in a loosely fitted state. A plurality of bus bars 130 (two bus bars 130 in the present embodiment), which will be described below, is held by the engagement portions on the other-side surface 138B of the plate-like portion 138 of the support member 135 in a loosely fitted state. As a result, the bus bars 130 are disposed on the area 137 where the first reduction gear 47 and the non-reduction spur gear 48 of the multi-stage spur reduction mechanism 40 are not disposed.

A plurality of engagement pins 155 as the engagement portions is disposed on the other-side surface 138B of the plate-like portion 138 of the support member 135 along paths where the bas bars 130 are disposed in a spaced-apart relationship. In the present embodiment, two engagement pins 155 are provided for each bus bar 130, whereby four engagement pins 115 are provided in total. Each of the engagement pins 155 has a substantially cylindrical shape as whole, and is divided into two semi-circular rod portions 155A and 155B spaced apart with a space 154 generated therebetween. In other words, the engagement pin 155 is configured in such a manner that the engagement pin 155 is divided along a direction perpendicular to a direction in which the bus bar 130 extends, and the one semi-circular rod portion 155A and the other semi-circular rod portion 155B are arranged along the direction in which the bus bar 130 extends. Further, the one semi-circular rod portion 155A and the other semi-circular rod portion 155B are disposed in such a manner that the slight space 154 is formed between the planar range of the one semi-circular rod portion 155A and the planar range of the other semi-circular rod portion 155B. Then, the one semi-circular rod portion 155A and the other semi-circular rod portion 155B include rod main body portions 155C and 155D, and bulging portions 155E and 155F at the tips of the rod main body portions 155C and 155D, respectively. The rod main body portions 155C and 155D have lengths erecting from the plate-like portion 138 longer than the thickness dimension of the bus bar 130, and the bulging portions 155E and 155F have semi-circular shapes of larger diameters than the rod main body portions 155C and 155D. The semi-circular rod portions 155A and 155B do not necessarily have to be arranged along the direction in which the bus bar 130 extends. For example, the semi-circular rod portions 155A and 155B may be arranged along the direction perpendicular to the direction in which the bus bar 130 extends. Further, the engagement pin 155 may be divided into not only two rods as described above, but also tree or more rods.

As illustrated in FIGS. 3, 5, and 9 to 12, the bus bars 130 electrically connect the supply terminals 131 disposed in the connector portion 35 of the housing 30, and the motor terminals 32C from the motor 32. The single bus bar 130 connects the single motor terminal 32C from the motor 32 and the single supply terminal 131 in the connector portion 35 of the housing 30. The bus bar 130 is constituted by, for example, an elongated plate-like body made of a highly conductive metal such as a copper alloy.

The bus bar 130 includes a plate-like main body portion 156, the motor-side socket portion 157, and the ECU-side socket portion 158, which are integrally formed. The plate-like main body portion 156 constitutes the main body of the bus bar 130, and is formed into an elongated plate-like shape. The motor-side socket portion 157 is firmed at one end of the plate-like main body portion 156, and functions as an elastic connection portion configured to be connected to the motor terminal 32C. The ECU-side socket portion 158 is formed at the other end of the plate-like main body portion 156, and functions as an elastic connection portion configured to be connected to the supply terminal 131. A plurality of support holes 159 is formed at the substantially central position in the width direction of the plate-like main body portion 156 in a spaced-apart relationship along the direction in which the bus bar 130 extends. The respective engagement pins 155 provided to the support member 135 are inserted into the respective support holes 159. The hole dimension of the support hole 159 is set so as to be smaller than the outer diameter dimension defined by the bulging portions 155E and 155F when the above-described engagement pin 155 is in a natural condition, and to be equal to or larger than the outer diameter dimension defined by the rod main body portions 155C and 155D when the engagement pin 155 is in a natural condition.

The motor-side socket portion 157 includes an insertion hole 162, a pair of rectangular contacts 163 and 163, and contact terminal portions 165. The insertion hole 162 is formed at one end of the plate-like main body portion 156. The pair of rectangular contacts 163 and 163 extend toward the motor 32 in the insertion hole 162 on the surface of the plate-like main body portion 156 that does not abut against the support member 135. The contact terminal portions 165 and 165 are formed by being respectively inwardly bent after vertically extending from the outer edge of the plate-like main body portion 156 toward the motor 32 so as to be connected to the pair of rectangular contacts 163 and 163, respectively. The pair of rectangular contacts 163 and 163 are disposed so as to face each other with an insertion space 164 generated to allow insertion of the motor terminal 32C of the motor 32 therebetween. The insertion space 164 between the pair of rectangular contacts 163 and 163 is provided so as to overlap the insertion hole 162 of the plate-like main body 156 in a planer view with the bus bar 130 held by the support member 135. The pair of rectangular contacts 163 and 163 is configured so as to be freely elastically deformed toward or away from each other. When the motor terminal 32C is inserted between the pair of rectangular contacts 163 and 163, the pair of rectangular contacts 16$ and 163 does not block this insertion by being elastically deformed away from each other, and maintain the motor terminal 32C and the pair of rectangular contacts 163 and 163 in as close contact state after the insertion.

On the other hand, the ECU-side socket portion 158 formed at the other end of the bus bar 130 is constituted by a pair of semi-circular contacts 166 protruding in the same direction as the pair of rectangular contacts 163 and 163. To form the semi-circular contacts 166 and 166, first, the other end of the plate-like main body portion 156 is bent in the direction toward the motor 32 to form as wide end portion, and the both ends of the wide-end portion 167 in the width direction thereof are curved inwardly toward each other into semi-circular shape, as a result of which the semi-circular contacts 166 are formed. Then, an insertion space 168 is formed between the wide end portion 167 and the respective ends of the semi-circular contacts 166 and 166.

Then, when the bus bar 130 is attached to the support member 135, the respect engagement pins 155 provided on the other-side surface 138B of the plate-like portion 138 of the support member 135 are aligned with the respective corresponding support holes 159 formed at the bus bar 130, and the respective engagement pins 155 are pushed in and inserted in the respective support holes 159, respectively. At this time, the bulging portions 155E and 155F of the respective engagement pins 155 move toward each other so as to reduce the space 154 therebetween, and the respective semi-circular rod portions 155A and 155B are elastically deformed from the base portion thereof so as to tilt in the direction toward each other. After the bulging portions 155E and 155F pass through the support hole 159, the respective semi-circular rod portions 155A and 155B return to the original state with the space 154 generated therebetween. In this manner, the bus bar 130 is held by the respective engagement pins 155 on the other-side surface 138B of the plate-like portion 138 of the support member 135 in a loosely fitted state, and is attached so as to be prevented from being dislodged from the support member 135 by the bulging portions 155E and 155F in a state before being connected to the supply terminal 131 and the motor terminal 32C.

Further, when the support member 135 is attached to the housing 30, the bus bar-side terminals 131A of the supply terminals 131 extending in the connector portion 35 of the housing 30 are inserted in the insertion spaces 168 between the semi-circular contacts 166 and 166 of the ECU side socket portions 158 formed at the other ends of the bus bars 130, and the motor terminals 32C from the motor 32 are inserted in the insertion spaces 164 between the respective rectangular contacts 163 and 163 of the motor-side socket portions 157 formed at the one ends of the bus bars 130. The support member 135 is attached to the housing 30 in this manner, whereby electric connections are established between the supply terminals 131 and the motor terminals 32C via the bus bars 130.

In this manner, in the disk brake 1 according to the first embodiment, the bus bar-side ends 131A of the supply terminals 131 extending in the connector portion 35 of the housing 30, and the motor terminals 32C from the motor 32 are electrically connected to each other via the bus bars 130, which are metallic plate-like members, whereby it is possible to robustly connect the motor 32 and the supply terminals 131 to prevent a connection failure therebetween.

In addition, the bus bars 130 are held by the respective engagement pins 155 in a loosely fitted state, on the other-side surface 138B of the plate-like portion 138 of the support member 135, which divides the interior of the housing into the area 136 where the first reduction gear 47 and the non-reduction spur gear 48 of the multi-stage spur reduction mechanism 40 are disposed, and the area 137 where they are not disposed. Therefore, the bus bars 130 are protected by the support member 135 especially from the first reduction gear 47 of the multi-stage spur reduction mechanism 40, and therefore can be prevented from being damaged by driving of the first reduction gear 47.

Further, in the disk brake 1 according to the first embodiment, the bus bars 130 are held on the other-side surface 138B of the plate-like portion 138 in a loosely fitted state with the respective engagement pins 155 provided on the other-side surface 138B of the plate-like portion 138 of the support member 135 inserted to the respective corresponding support holes 159 formed on the bus bars 130, and prevented from being dislodged therefrom due to the bulging portions 155E and 155F at the tips of the respective engagement portions 155. As a result, a vibration can be prevented from being transmitted from the support member 135 to the bus bars 130 when the disk brake 1 is in operation, thereby preventing the bus bars 130 from being damaged. Further, a vibration can be prevented from being transmitted from the support member 135 to the bus bars 130, thereby preventing a connection failure in the connection between the bus bars 130 and the bus bar-side ends 131A of the supply terminals 131, and the connection between the bus bars 130 and the motor terminals 32C, which otherwise might be caused over time.

Further, in the disk brake 1 according to the first embodiment, the ECU-side socket portions 158 of the bus bars 130, where the bus bar-side ends 131A of the supply terminals 131 are inserted, are constituted by elastic connection portions, while the motor-side socket portions 157, where the motor terminals 32C from the motor 32 are inserted, are also constituted by elastic connection portions. Therefore, it is possible to prevent a contact failure at the contact portions.

Figure 13:
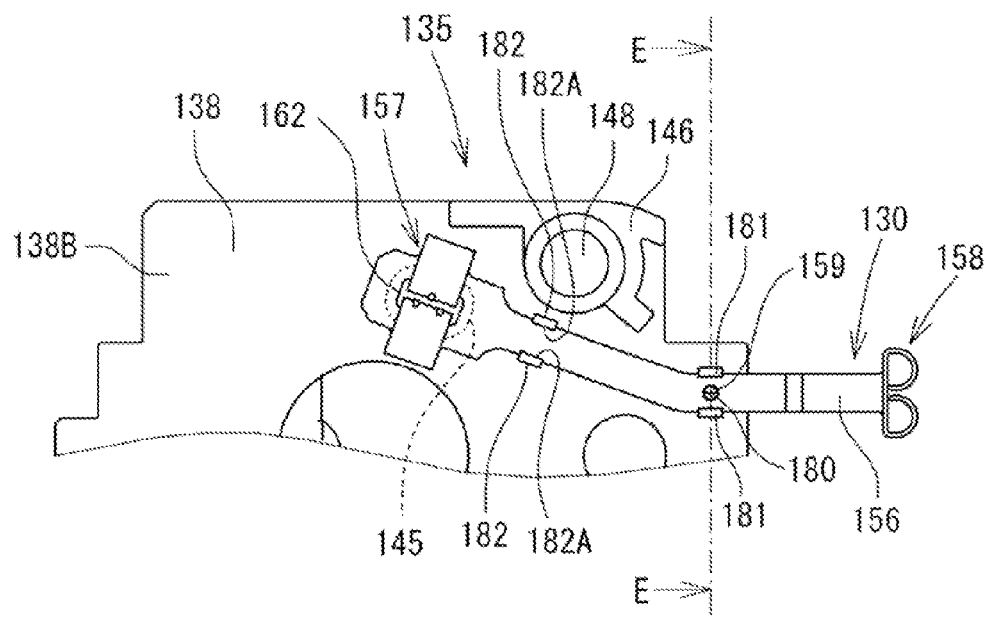
FIG. 13 illustrates a support member with each bus bar supported thereon according to a second embodiment, as viewed from the motor side.
Figure 14:
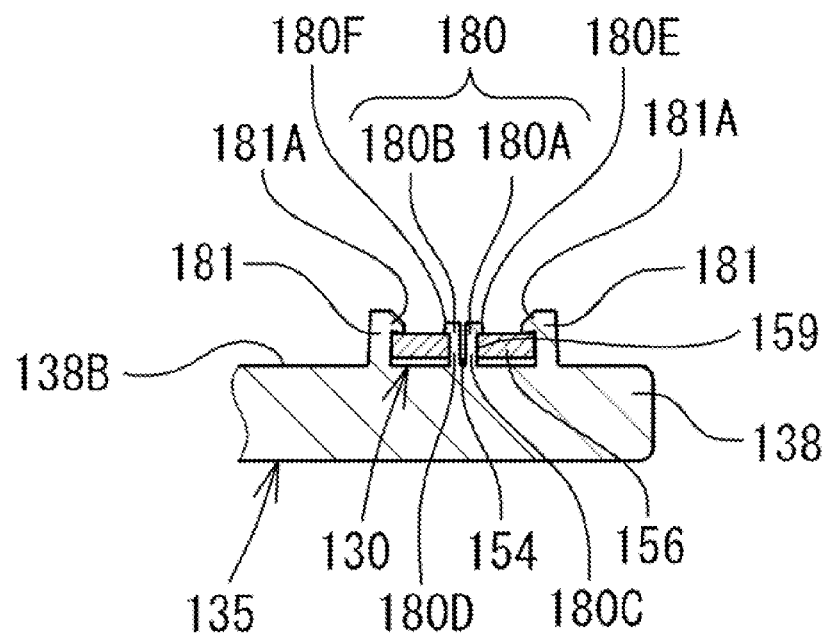
FIG. 14 is a cross-sectional view taken along a line E-E in FIG. 13.

Next, a second embodiment will be described with reference to FIGS. 13 and 14. In the second embodiment, the bus bars 130 are held on the other-side surface 138B of the plate-like portion 138 of the support member 135 by the engagement portions in a loosely fitted state. Similar members to the above-described first embodiment will be identified by the same reference numerals, and will not be described repeatedly.

In the second embodiment, a single engagement pin 180 is provided as the engagement portion at the end side of the other-side surface 138B of the plate-like portion 138 of the support member 135 in a similar manner to the first embodiment. A pair of support rods 181 and 181 is formed in a protruding manner at the both sides of the engagement pin 180 as the engagement portions. The support rods 181 and 181 support the plate-like main body portion 156 of the bus bar 130 so as to sandwich it from the width direction. The engagement pin 180 includes one semi-circular rod portion 180A and another semi-circular rod portion 180B, and is formed so as to have the space 154 generated therebetween in a similar manner to the first embodiment. However, the respective semi-circular rod portions 180A and 180B are configured so as to be arranged in the direction perpendicular to the direction in which the bus bar 130 extends. The respective semi-circular rod portions 180A and 180B include rod main body portions 180C and 180D and bulging portions 180F and 180F formed at the tips of the rod main body portions 180C and 180D in a similar manner to the first embodiment. Further, the pair of support rods 181 and 181 is erected from the other-side surface 138B of the plate-like portion 138 so as to have as wider space therebetween than the width dimension of the bus bar 130. Claw portions 181A and 181A extending in directions facing each other are formed at the tip sides of the support rods 81 and 181. Tapered portions are formed at the tip surfaces of the claw portions 181A and 181A. Further, a pair of support rods 182 and 182 is formed in a protruding manner on the other-side surface 138B of the plate-like portion 138 of the support member 135 so as to sandwich as portion of the plate-like main body portion 156 of the bus bar 130 proximate to the insertion hole 162 from the width direction. This pair of support rods 182 and 182 is configured in a similar manner to the above-described pair of support rods 181 and 181, and includes claw portions 182A and 182A, which extend in the direction facing each other, at the tips thereof.

Then, when the bus 130 is attached to the support member 135, the bus bar 130 is disposed on the other-side surface 138B of the plate-like portion 138 of the support member 135 so as to extend between the pair of support rods 181 and 181 (182 and 182), while the engagement pin 180 provided at the other-side surface 138B of the plate-like portion 138 is aligned with the support hole 159 of the bus bar 130, and the bus bar 130 is aligned with the support member 135 in such a manner that the both ends of the bus bar 130 in the width direction thereof abut between the tips of the pair of support rods 181 and 181 and the pair of support rods 182 and 182. Then, the bus bar 130 is pushed in so as to be moved toward the other-side surface 138B of the plate-like portion 138, whereby the engagement pin 180, the pair of support rods 181 and 181, and the pair of support rods 182 and 182 are elastically deformed in such a manner that the bulging portions 180E and 180F of the respective semi-circular rod portions 180A and 180B constituting the engagement pin 180 are moved toward each other, and the claw portions 181A and 181A of the pair of support rods 181 and 181, and the claw portions 182A and 182A of the pair of support rods 182 and 182 are moved away from each other. After the bus bar 130 is further pushed in, and pass through the bulging portions 180F and 180F of the engagement pin 180, the claw portions 181A and 181A of the pair of support rods 181 and 181, and the claw portions 182A and 182A of the pair of support rods 182 and 182, the bus bar 130 is held on the other-side surface 138B of the plate-like portion 138 of the support member 135 in a loosely fitted state by the engagement pin 180, the pair of support rods 181 and 181, and the pair of support rods 182 and 182. The second embodiment configured in this manner can also provide similar effects to the above-described first embodiment.

Next, a third embodiment will be described with reference to FIGS. 15 and 16. In the third embodiment, the bus bars 130 are held on the other-side surface 138B of the plate-like portion 138 of the support member 135 by the engagement portions in a loosely fitted state. Similar members to the above-described first embodiment will be identified by the same reference numerals, and will not be described repeatedly.

Figure 11:
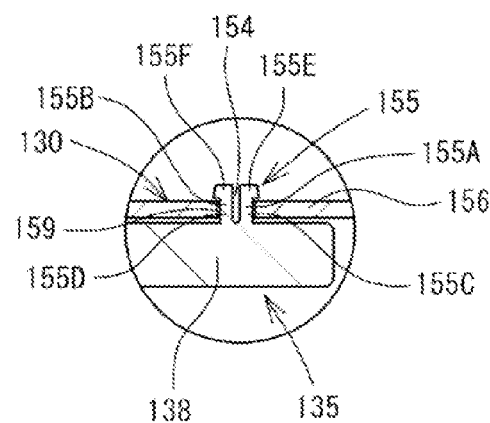
FIG. 11 is an enlarged view illustrating a portion D in FIG. 10.
Figure 12:
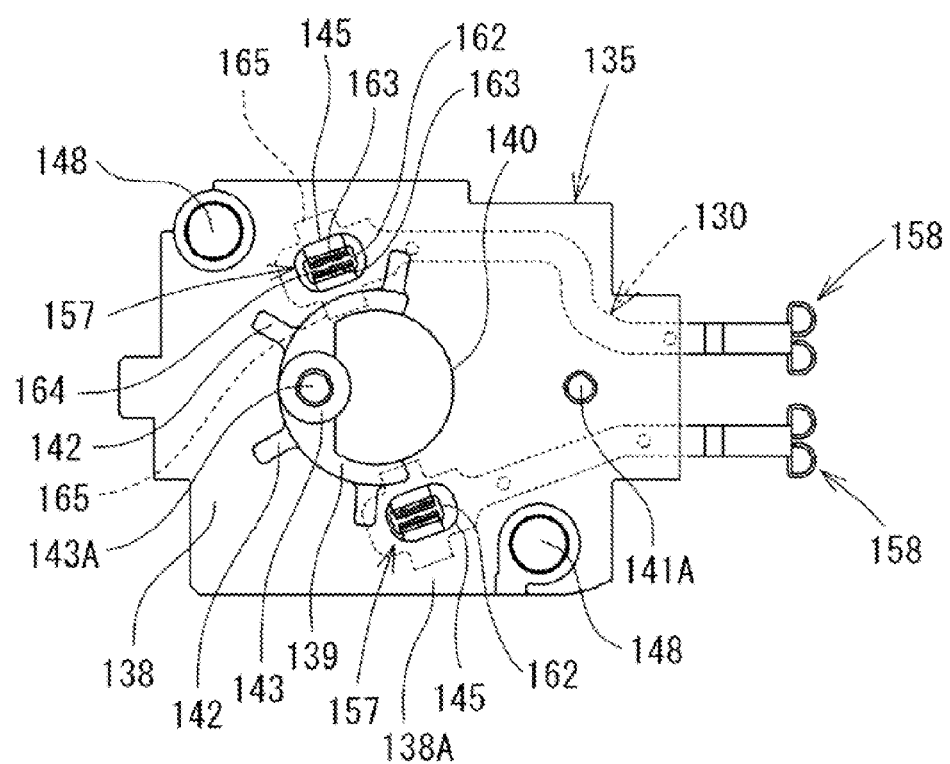
FIG. 12 illustrates the support member with each bus bar supported thereon as viewed from the cover side.
Figure 15:
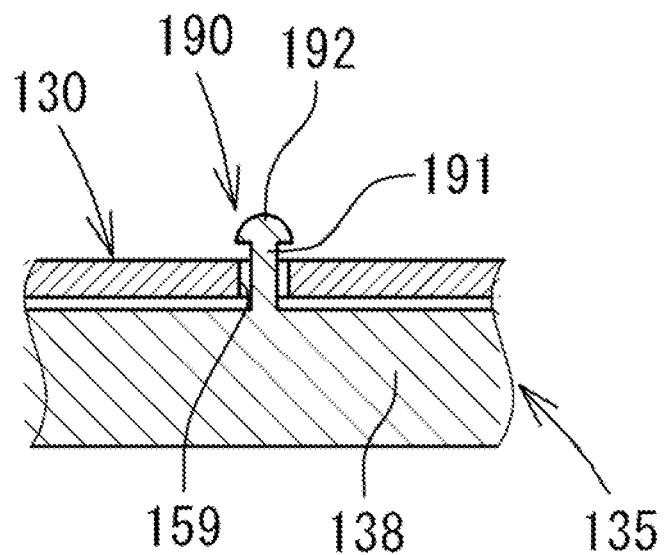
FIG. 15 illustrates a third embodiment, and is a cross-sectional view corresponding to FIG. 11 illustrating the first embodiment.
Figure 16:
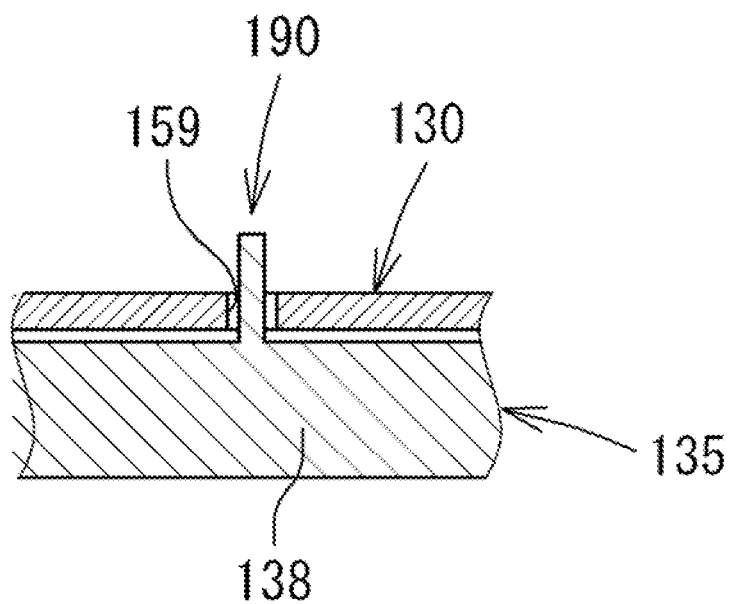
FIG. 16 is a cross-sectional view illustrating the third embodiment illustrated in FIG. 15 before shaping.

FIG. 15 illustrates the third embodiment, and is a cross-sectional view of parts similar to those illustrated in FIG. 11, which illustrates the first embodiment. The third embodiment is different from the first embodiment in terms that the engagement pin as the engagement portion is not divided unlike the engagement pin 155 in the first embodiment. An engagement pin 190 is a cylindrical member erected from the other-side surface 138B of the plate-like portion 138 of the support member 135 as illustrated in FIG. 16, in as state before the bus bar 130 is held by the support member 135. Then, heat is applied to the tip of the engagement pin 190 with the bus bar 130 inserted through as cylindrical main body portion 191 of the engagement pin 190, thereby forming a bulging portion 192 at the tip of the engagement pin 190 as illustrated in FIG. 15 to hold the bus bar 130 on the support member 135 in as loosely fitted state. The third embodiment configured in this manner can also provide similar effects to the above-described first embodiment.

In the above-described first to third embodiments, the bulging portions 155E and 155F of the engagement pin 155, the bulging portions 180E and 180F of the engagement pin 180, and the bulging portion 192 of the engagement pin 190 are integrally formed at the engagement pins 155, 180, and 190. However, the present invention is not limited thereto. The bus bar 130 may be held by the engagement pins 155, 180, and 190 in a loosely fitted state with the bulging portions thereof formed from a separate member from the engagement pins 155, 180, and 199, for example, an E-type clip and a rubber cap. Further, in the above-described first to third embodiments, the engagement pins 155, 180, and 190 are integrally formed on the support member 135. However, the present invention is not limited thereto. The bus bar 130 may be held on the support member 135 in a loosely fitted state with the engagement pins 155, 180, and 190 formed from a separate member from the support member 135. Further, in the second embodiment, both the engagement pin 180 and the pair of support rods 181 and 181, and 182 and 182 are used as the engagement portions, but only any one of them may be used. Further, the engagement portion is not limited to the engagement pins 155, 180, and 190, and the support rods 181 and 181 and 182 and 182. For example, the bus bar 130 may be held by a staple of a stapler in a loosely titled state.

In the above-described embodiments, the disk brake includes the caliper configured to press the pads against the disk by the piston slidably disposed in the cylinder, and the piston driving mechanism disposed in the caliper and configured to move the piston by a driving force of the electric motor. The piston driving mechanism includes the housing to which the electric motor is fixed. The housing contains the speed reduction mechanism configured to transmit the driving three of the electric motor. The connector portion is formed at the housing. The connector portion includes the supply terminals for supplying power to the electric motor. The supply terminals of the connector portion and the motor terminals of the electric motor are connected to each other via the bus bars made of metallic plate-like members.

According to this configuration, the supply terminals of the connector portion and the motor terminals of the electric motor are connected by the bus bars made of metallic plate-like members, whereby it is possible to robustly connect the motor and the connector portion, preventing as connection failure therebetween.

In the above-described embodiments, the housing is divided into the area where the speed reduction mechanism is located, and the area where the speed reduction mechanism is not located, and the bus bars are disposed at the area where the speed reduction mechanism is not located.

According to this configuration, the bus bars are protected from the speed reduction mechanism, and therefore can be prevented from being damaged by driving of the speed reduction mechanism.

In the above-described embodiments, the housing is divided into the area where the speed reduction mechanism is located and the area where the speed reduction mechanism is not located by the plate-like member that supports the electric motor.

According to this configuration, the bus bars are protected from the speed reduction mechanism by the plate-like member that supports the electric motor, and therefore can be prevented from being damaged by driving of the speed reduction mechanism.

In the above-described embodiments, the plate-like member includes the engagement portions that hold the bus bars on the plate-line member in a loosely fitted state.

According to this configuration, a vibration generated when the disk brake is in operation can be prevented from being transmitted to the has bars via the plate-like member, and therefore the bus bars can be prevented from being damaged. Further, a contact failure can be prevented from occurring over time at the connections between the bus bars and the supply terminals of the connector portion, and the connections between the bus bars and the motor terminals of the electric motor.

In the above-described embodiments, the housing includes the plate-like member that divides the housing into the area where the speed reduction mechanism is located, and the area where the speed reduction mechanism is not located. The plate-like member includes the engagement portions that hold the bus bars on the plate-like member in as loosely fitted state.

According to this configuration, the bus bars are protected from the speed reduction mechanism by the plate-like portion that supports the electric motor, and therefore can be prevented from being damaged by driving of the speed reduction mechanism. Further, a vibration generated when the disk brake is in operation can be prevented from being transmitted to the has bars via the plate-like member, and therefore the bus bars can be prevented from being damaged. Further, a contact failure can be prevented from occurring over time at the connections between the bus bars and the supply terminals of the connector portion, and the connections between the bus bars and the motor terminals of the electric motor.

In the above-described embodiments, the plate-like member is the support member supported by the housing with the one-side surface thereof supporting the shaft rotatably supporting the speed reduction Mechanism and the other-side, surface thereof facing the electric motor.

According to this configuration, the bus bars can be protected from the speed reduction mechanism by the support member and therefore can be prevented from being damaged by driving of the speed reduction mechanism.

In the above-described embodiments, the bus bars are held on the other-side surface of the support member.

According to this configuration, the bus bars can be protected from the speed reduction mechanism by the support member, and therefore can be prevented from being damned by driving of the speed reduction mechanism.

In the above-described embodiments, each of the bus bars includes elastic connection portions formed at both ends thereof. The elastic connection portions are elastically connected to the supply terminals of the connector and the motor terminals of the electric motor, respectively.

According to this configuration, a contact failure can be prevented from occurring at the contact portions of the bus bars.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No, 2012-170458, filed on Jul. 31, 2012. The entire disclosure of Japanese Patent Applications No 2012-170458, filed on Jul. 31, 2012 including specification, claims, drawings and summary is incorporated herein by reference in its entirety.

What is claimed is:

1. A disk brake comprising:
a caliper configured to press a pad against a disk by a piston slidably disposed in a cylinder; and
a piston driving mechanism disposed in the caliper, and configured to move the piston by a driving force of an electric motor,
wherein the piston driving mechanism includes a single housing to which the electric motor is fixed, the single housing containing a speed reduction mechanism configured to transmit the driving force of the electric motor,
wherein a connector portion is formed at the single housing, the connector portion including a supply terminal for supplying power to the electric motor, and a plate-like member for rotatably supporting the speed reduction mechanism is provided at the single housing,
wherein the plate-like member divides the single housing into a first area where the speed reduction mechanism is located and a second area where the speed reduction mechanism is not located,
wherein the supply terminal is formed so as to have one end penetrating through a wall portion between the connector portion and the housing, and the other end extending in the second area of the housing,
wherein the electric motor has a motor terminal extending in the second area of the housing toward the plate-like member in a same direction as a direction in which a rotational shaft of the electric motor extends,
wherein the other end of the supply terminal and the motor terminal are connected to each other via a bus bar made of a metallic plate, and
wherein the bus bar is supported by the plate-like member, and is arranged in the second area between the electric motor and the plate-like member.

2. The disk brake according to claim 1, wherein the plate-like member includes an engagement portion that holds the bus bar on the plate-like member in a loosely fitted state.

3. The disk brake according to claim 2, wherein the plate-like member has a first surface and a opposed second surface and is a support member supported by the housing with the first surface thereof supporting a shaft rotatably supporting the speed reduction mechanism and the second surface thereof facing the electric motor.

4. The disk brake according to claim 3, wherein the bus bar is held on the second surface of the support member.

5. The disk brake according to claim 1, wherein the plate-like member has a first surface and a second surface and is a support member supported by the housing with the first surface thereof supporting a shaft rotatably supporting the speed reduction mechanism and the second surface thereof facing the electric motor.

6. The disk brake according to claim 5, wherein the bus bar is held on the second surface of the support member.

7. The disk brake according to claim 1, wherein the plate-like member includes an engagement portion that holds the bus bar on the plate-like member in a loosely fitted state.

8. The disk brake according to claim 7, wherein the plate-like member is a support member supported by the housing with a first surface thereof supporting a shaft rotatably supporting the speed reduction mechanism and a second surface thereof facing the electric motor.

9. The disk brake according to claim 8, wherein the bus bar is held on the second surface of the support member.

10. The disk brake according to claim 1, wherein the bus bar includes elastic connection portions formed at both ends thereof, the elastic connection portions being elastically connected to the supply terminal of the connector portion and the motor terminal of the electric motor, respectively.

11. A disk brake comprising:
a caliper configured to press a pad against a disk by a piston slidably disposed in a cylinder; and
a piston driving mechanism disposed in the caliper, and configured to move the piston by a driving force of an electric motor,
wherein the piston driving mechanism includes a single housing to which the electric motor is fixed, the single housing containing a speed reduction mechanism configured to transmit the driving force of the electric motor,
wherein a connector portion is formed at the single housing, the connector portion including a supply terminal for supplying power to an electric terminal of the electric motor via a bus bar made of a metallic plate,
wherein the supply terminal is formed so as to have one end penetrating through a wall portion between the connector portion and the housing, and the other end extending in the housing,
wherein the motor terminal extends in the housing in a same direction as a direction in which a rotational shaft of the electric motor extends,
wherein a support member is provided in the housing, the support member having a first surface supporting a rotator of the speed reduction mechanism and an opposed second surface thereof facing the electric motor and supported by the housing, the support member dividing the single housing into a first area where the speed reduction mechanism is located and a second area where the speed reduction mechanism is not located, and
wherein the bus bar is held on the second surface of the support member.

12. The disk brake according to claim 11, wherein an engagement portion is formed on the second surface of the support member, the engagement portion holding the bus bar on the support member in a loosely fitted state.

13. A disk brake comprising:
a caliper configured to press a pad against a disk; and
a driving mechanism disposed in the caliper, and configured to move a member configured to press the pad by a driving force of an electric motor,
wherein the driving mechanism includes a single housing to which the electric motor is fixed, the single housing containing a speed reduction mechanism configured to transmit the driving force of the electric motor,
wherein a connector portion is formed at the single housing, the connector portion including a supply terminal for supplying power to the electric motor via a bus bar made of a metallic plate, wherein the supply terminal is formed so as to have one end penetrating through a wall portion between the connector portion and the housing, and the other end extending in the housing, wherein a dividing member is provided in the single housing, the dividing member being supported by the housing, the dividing member dividing the single housing into a first area where the speed reduction mechanism is located and a second area where the electric motor is located, the dividing member supporting the speed reduction mechanism, wherein the dividing member holds a plate-like conductor on a surface facing the electric motor, and wherein the plate-like conductor electrically connects the supply terminal and the motor terminal extending in the housing in the direction in which the rotational shaft of the electric motor extends.

14. The disk brake according to claim 13, wherein the dividing member has a first surface and an opposed second surface, and an engagement portion is formed on the second surface of the dividing member, the engagement portion holding the bus bar on the dividing member in a loosely fitted state.

* * * * *